United States Patent
Li et al.

(10) Patent No.: US 7,489,934 B2
(45) Date of Patent: Feb. 10, 2009

(54) OFDMA WITH ADAPTIVE SUBCARRIER-CLUSTER CONFIGURATION AND SELECTIVE LOADING

(75) Inventors: Xiaodong Li, Bellevue, WA (US); Hui Liu, Clyde Hill, WA (US); Wenzhong Zhang, Bellevue, WA (US); Kemin Li, Bellevue, WA (US)

(73) Assignee: Adaptix, Inc., Bellevue, WA (US)

( * ) Notice: Subject to any disclaimer, the term of this patent is extended or adjusted under 35 U.S.C. 154(b) by 0 days.

(21) Appl. No.: 11/931,759

(22) Filed: Oct. 31, 2007

(65) Prior Publication Data

US 2008/0062953 A1  Mar. 13, 2008

Related U.S. Application Data

(63) Continuation of application No. 11/199,586, filed on Aug. 8, 2005, which is a continuation of application No. 09/738,086, filed on Dec. 15, 2000, now Pat. No. 6,947,748.

(51) Int. Cl.
| | |
|---|---|
| H04W 72/00 | (2006.01) |
| H04W 40/00 | (2006.01) |
| H04W 1/00 | (2006.01) |
| H04B 7/00 | (2006.01) |
| H04B 1/38 | (2006.01) |
| H04B 7/208 | (2006.01) |
| H04M 1/00 | (2006.01) |
| H04J 1/00 | (2006.01) |

(52) U.S. Cl. .................. 455/453; 455/448; 455/450; 455/452.2; 455/561; 455/509; 455/550.1; 455/556.2; 370/329; 370/341; 370/343; 370/344

(58) Field of Classification Search ......... 370/203–204, 370/206–208, 230, 310, 315, 319–321, 328–339, 370/341–350, 430–431, 436–438, 441–442, 370/465, 468, 477–483, 931; 455/41.2, 62, 455/63.1–63.4, 67.11, 101–102, 422.1, 445–451, 455/452.1–452.2, 453, 463–464, 509, 524–526, 455/561, 562.1, 66.1, 423–424, 550.1, 556.2; 375/267, 299, 347; 376/114, 148, 346–349
See application file for complete search history.

(56) References Cited

U.S. PATENT DOCUMENTS 4,670,889 A * 6/1987 Hewitt ........................ 375/356

(Continued)

FOREIGN PATENT DOCUMENTS

DE  198 00 953  7/1999

(Continued)

OTHER PUBLICATIONS

Ritter, Gerhard: Procedure and Radio Communication System to Allocate the Radio Resources of a Radio Interface, Jun. 2007; Translated by: "Schreiber Translations inc.", Washington, DC. (Publication No. PN=19800953), pp. at least 4-9, 12, 18-19, 23, 25 and 27.*

(Continued)

Primary Examiner—Meless N Zewdu
(74) Attorney, Agent, or Firm—Fulbright & Jaworski L.L.P.

(57) ABSTRACT

A method and apparatus for allocating subcarriers in an orthogonal frequency division multiple access (OFDMA) system is described. In one embodiment, the method comprises allocating at least one diversity cluster of subcarriers to a first subscriber and allocating at least one coherence cluster to a second subscriber.

12 Claims, 7 Drawing Sheets

U.S. PATENT DOCUMENTS

| | | | |
|---|---|---|---|
| 5,239,676 A | | 8/1993 | Strawczynski et al. |
| 5,280,630 A | | 1/1994 | Wang |
| 5,437,054 A | * | 7/1995 | Rappaport et al. .......... 455/447 |
| 5,479,447 A | | 12/1995 | Chow et al. |
| 5,504,775 A | | 4/1996 | Chouly et al. |
| 5,507,034 A | | 4/1996 | Bodin et al. |
| 5,515,378 A | | 5/1996 | Roy, III et al. |
| 5,555,268 A | | 9/1996 | Fattouche et al. |
| 5,588,020 A | | 12/1996 | Schilling |
| 5,708,973 A | | 1/1998 | Ritter et al. |
| 5,726,978 A | | 3/1998 | Frodigh et al. |
| 5,734,967 A | | 3/1998 | Kotzin et al. |
| 5,774,808 A | | 6/1998 | Sarkioja et al. |
| 5,822,372 A | | 10/1998 | Emami |
| 5,839,074 A | * | 11/1998 | Plehn .......................... 455/450 |
| 5,867,478 A | | 2/1999 | Baum et al. |
| 5,886,988 A | * | 3/1999 | Yun et al. .................... 370/329 |
| 5,887,245 A | | 3/1999 | Lindroth et al. |
| 5,909,436 A | | 6/1999 | Engstrom et al. |
| 5,914,933 A | | 6/1999 | Cimini et al. |
| 5,933,421 A | | 8/1999 | Alamouti et al. |
| 5,956,642 A | | 9/1999 | Larsson et al. |
| 5,973,642 A | | 10/1999 | Li et al. |
| 5,991,273 A | | 11/1999 | Abu-Dayya et al. |
| 6,005,876 A | | 12/1999 | Cimini, Jr. et al. |
| 6,009,553 A | | 12/1999 | Martinez et al. |
| 6,023,622 A | * | 2/2000 | Plaschke et al. .......... 455/452.2 |
| 6,026,123 A | | 2/2000 | Williams |
| 6,041,237 A | | 3/2000 | Farsakh et al. |
| 6,052,594 A | | 4/2000 | Chuang et al. |
| 6,061,568 A | | 5/2000 | Dent |
| 6,064,692 A | | 5/2000 | Chow |
| 6,064,694 A | | 5/2000 | Clark et al. |
| 6,067,290 A | | 5/2000 | Paulraj et al. |
| 6,108,374 A | | 8/2000 | Balachandran et al. |
| 6,111,919 A | | 8/2000 | Yonge, III |
| 6,131,016 A | | 10/2000 | Greenstein et al. |
| 6,141,565 A | | 10/2000 | Feuerstein et al. |
| 6,144,696 A | | 11/2000 | Shively et al. |
| 6,226,320 B1 | | 5/2001 | Hakkinen et al. |
| 6,276,297 B1 | | 8/2001 | van den Berg et al. |
| 6,282,185 B1 | | 8/2001 | Hakkinen et al. |
| 6,298,092 B1 | | 10/2001 | Heath, Jr. et al. |
| 6,307,851 B1 | | 10/2001 | Jung et al. |
| 6,327,472 B1 | | 12/2001 | Westroos et al. |
| 6,330,460 B1 | | 12/2001 | Wong et al. |
| 6,366,195 B1 | | 4/2002 | Harel et al. |
| 6,377,632 B1 | | 4/2002 | Paulraj et al. |
| 6,377,636 B1 | | 4/2002 | Paulraj et al. |
| 6,411,186 B1 | * | 6/2002 | Lilleberg et al. ............ 335/252 |
| 6,415,153 B1 | * | 7/2002 | Liew .......................... 455/453 |
| 6,449,246 B1 | | 9/2002 | Barton et al. |
| 6,473,467 B1 | | 10/2002 | Wallace et al. |
| 6,477,158 B1 | | 11/2002 | Take et al. |
| 6,493,331 B1 | | 12/2002 | Walton et al. |
| 6,501,785 B1 | | 12/2002 | Chang et al. |
| 6,526,281 B1 | | 2/2003 | Gorsuch et al. |
| 6,539,233 B1 | | 3/2003 | Taketsugu et al. |
| 6,545,997 B1 | | 4/2003 | Bohnke et al. |
| 6,553,001 B1 | | 4/2003 | Indira |
| 6,567,383 B1 | | 5/2003 | Bohnke et al. |
| 6,657,949 B1 | | 12/2003 | Jones, IV et al. |
| 6,693,884 B1 | | 2/2004 | Gutowski |
| 6,726,297 B1 | | 4/2004 | Uesugi et al. |
| 6,795,424 B1 | | 9/2004 | Kapoor et al. |
| 6,834,045 B1 | | 12/2004 | Lappetelaeinen et al. |
| 6,904,283 B2 | | 6/2005 | Li et al. |
| 6,920,122 B1 | * | 7/2005 | Hanaoka et al. ............. 370/331 |
| 6,928,120 B1 | | 8/2005 | Zhang |
| 6,947,748 B2 | | 9/2005 | Li et al. |
| 6,985,432 B1 | | 1/2006 | Hadad et al. |
| 7,047,011 B1 | * | 5/2006 | Wikman ..................... 455/442 |
| 7,146,172 B2 | | 12/2006 | Li et al. |
| 7,373,151 B1 | * | 5/2008 | Ahmed .................... 455/452.2 |
| 7,379,742 B2 | | 5/2008 | Li et al. |
| 2002/0114269 A1 | | 8/2002 | Onggosanusi et al. |
| 2003/0067890 A1 | | 4/2003 | Goel et al. |
| 2003/0169681 A1 | | 9/2003 | Li et al. |
| 2003/0169824 A1 | | 9/2003 | Chayat |
| 2005/0025099 A1 | | 2/2005 | Heath et al. |

FOREIGN PATENT DOCUMENTS

| | | |
|---|---|---|
| EP | 0 869 647 A2 | 10/1998 |
| EP | 0882377 B1 | 12/1998 |
| EP | 0 926 912 A2 | 6/1999 |
| EP | 0 929 202 A1 | 7/1999 |
| EP | 0999658 | 5/2000 |
| FR | 2 777 407 A1 | 10/1999 |
| GB | 2 209 858 A | 5/1989 |
| JP | 1-317035 | 12/1989 |
| JP | 06029922 | 2/1994 |
| JP | 10-303849 | 11/1998 |
| JP | 11-088244 | 3/1999 |
| JP | 11-308153 | 11/1999 |
| WO | WO-/97/01256 | 1/1997 |
| WO | WO-98/16077 A2 | 4/1998 |
| WO | WO-98/30047 A1 | 7/1998 |
| WO | WO-02 49305 A2 | 6/2002 |

OTHER PUBLICATIONS

Bender et al., CDMA/HDR: A Bandwidth-Efficient High-Speed Wireless Data Service for Nomadic Users, IEEE Communications Magazine, Jul. 2000, pp. 70-87.

English translation of Japanese Office Action for Application No. 2002-550683, dispatched May 7, 2007, 2 ppgs.

English translation of Japanese Office Action for Application No. 2002-550747, dispatched May 21, 2007, 4 ppgs.

European Office Action from Application No. 01 986 165.7, dated Mar. 29, 2007, 5 ppgs.

Farsakh, C. et al., "Maximizing the SDMA Mobile Radio Capacity Increase by DOA Sensitive Channel Allocation," Wireless Personal Communications, Kluwer Academic Publishers, NL, vol. 11, No. 1. Oct. 1999, pp. 63-76, XP000835062, ISSN: 0929-6212.

Frullone et al., PRMA Performance in Cellular Environments with Self-Adaptive Channel Allocation Strategies, IEEE Transactions on Vehicular Technology, Nov. 1996, pp. 657-665, vol. 45, No. 4.

Gruenheid, R. et al: "Adaptive Modulcation and Multiple Access for the OFDM Transmission Technique," Wireless Personal Communications, Kluwer Academic Publishers, NL, vol. 13, NR. 1/2, Year 2000, pp. 5-13 XP000894156, ISSN: 0929-6212.

Kapoor, S. et al.: "Adaptive Interference Suppression in Multiuser Wireless, OFDM Systems Using Antenna Arrays," IEEE Transactions on Signal Processing, vol. 47, No. 12, Dec. 1999, pp. 3381-3391, XP000935422, IEEE, NY, USA, ISSN: 1053-587X.

Kinugawa, Y.et al.: "Frequency and Time Division Multiple Access with Demand-Assignment Using Multicarrier Modulation for Indoor Wireless Communications Systems," IEICE Transactions on Communications, Institute of Electronics Information and Comm. Eng. Tokyo, Japan, vol. E77-B, NR. 3, Mar. 1994, pp. 396-402, XP000451014, ISSN: 0916-8516.

Motegi, M. et al.: Optimum Band Allocation According to Subband Condition for BST-OFDM 11th IEEE International Symposium on Personal Indoor and Modile Radio Communications, vol. 2, Sep. 18-21, 2000, pp. 1236-1240, XP002213669, Piscataway, NJ, USA, ISBN: 0-7803-6463-5.

Nogueroles, R. et al.: Improved Performance of a Random OFDMA Mobile Communication System: Vehicular Technology Conference, 1998. VTC 98. 48th IEEE Ottawa, Ontario, Canada, May 18-21, 1998, pp. 2502-2506, XP010288120, ISBN: 0-7803-4320-4.

Office Action issued for Korean Patent Application 2003-7007961 dated Sep. 27, 2006.

Shad et al., Indoor SDMA Capacity Using a Smart Antenna Basestation, 1997 IEEE, pp. 868-872.

Tsoulos, G.V., Smart Antennas for Mobile Communication Systems: Benefits and Challenges, Electronics & Communication Engineering Journal, Apr. 1999, pp. 84-94.

Vittoria Mignone et al. "CD3-OFDM: A Novel Demodulation Scheme for Fixed and Mobile Receivers," IEEE Transactions on Communications, Sep. 1996, vol. 44, No. 9.

Ward, James and Compton, R. Ted, Jr., High Throughput Slotted ALOHA Packet Radio Networks with Adaptive Arrays, IEEE Transactions on Communications, Mar. 1993, pp. 460-470, vol. 41, No. 3.

Wong, C. Y., et al., Multiuser OFDM With Adaptive Subcarrier, Bit and Power Allocation, IEEE Journal on Selected Areas in Communications, Oct. 1999, IEEE Inc., New York, USA, vol. 17, Nr. 10, pp. 1747-1758, XP000855475, ISSN: 0733-8716 Sections I and II abstract.

Xu, Guanghan, and Li, San-Qi, Throughput Multiplication of Wireless Lans for Multimedia Services: SDMA Protocol Design, 1994 IEEE, pp. 1326-1332.

Ye Li, et al.: "Clustered OFDM with channel estimation for high rate wireless data," Mobile Multimedia Communications, 1999. (MOMUC '99). 1999 IEEE International Workshop on San Diego, CA, USA, IEEE, US, Nov. 15, 1999, p. 43-50, XP010370695, ISBN: 0-7803-5904-6.

* cited by examiner

| Group ID1 | SINR1 | SINR2 | SINR3 | Group ID2 | SINR1 | SINR2 | SINR3 | • • • a. Cell A

OFDMA WITH ADAPTIVE SUBCARRIER-CLUSTER CONFIGURATION AND SELECTIVE LOADING

CROSS-REFERENCE TO RELATED APPLICATIONS

This is a Continuation of U.S. patent application Ser. No. 11/199,586 filed Aug. 8, 2005, entitled OFDMA WITH ADAPTIVE SUBCARRIER-CLUSTER CONFIGURATION AND SELECTIVE LOADING, which is a Continuation of U.S. Pat. No. 6,947,748 issued Sep. 20, 2005, entitled OFDMA WITH ADAPTIVE SUBCARRIER-CLUSTER CONFIGURATION AND SELECTIVE LOADING, the disclosures of which are incorporated herein by reference.

FIELD OF THE INVENTION

The invention relates to the field of wireless communications; more particularly, the invention relates to multi-cell, multi-subscriber wireless systems using orthogonal frequency division multiplexing (OFDM).

BACKGROUND OF THE INVENTION

Orthogonal frequency division multiplexing (OFDM) is an efficient modulation scheme for signal transmission over frequency-selective channels. In OFDM, a wide bandwidth is divided into multiple narrowband subcarriers, which are arranged to be orthogonal with each other. The signals modulated on the subcarriers are transmitted in parallel. For more information, see Cimini, Jr., "Analysis and Simulation of a Digital Mobile Channel Using Orthogonal Frequency Division Multiplexing," IEEE Trans. Commun., vol. COM-33, no. 7, July 1985, pp. 665-75; Chuang and Sollenberger, "Beyond 3G: Wideband Wireless Data Access Based on OFDM and Dynamic Packet Assignment," IEEE Communications Magazine, Vol. 38, No. 7, pp. 78-87, July 2000.

One way to use OFDM to support multiple access for multiple subscribers is through time division multiple access (TDMA), in which each subscriber uses all the subcarriers within its assigned time slots. Orthogonal frequency division multiple access (OFDMA) is another method for multiple access, using the basic format of OFDM. In OFDMA, multiple subscribers simultaneously use different subcarriers, in a fashion similar to frequency division multiple access (FDMA). For more information, see Sari and Karam, "Orthogonal Frequency-Division Multiple Access and its Application to CATV Networks," European Transactions on Telecommunications, Vol. 9 (6), pp. 507-516, November/December 1998 and Nogueroles, Bossert, Donder, and Zyablov, "Improved Performance of a Random OFDMA Mobile Communication System," Proceedings of IEEE VTC'98, pp. 2502 -2506.

Multipath causes frequency-selective fading. The channel gains are different for different subcarriers. Furthermore, the channels are typically uncorrelated for different subscribers. The subcarriers that are in deep fade for one subscriber may provide high channel gains for another subscriber. Therefore, it is advantageous in an OFDMA system to adaptively allocate the subcarriers to subscribers so that each subscriber enjoys a high channel gain. For more information, see Wong et al., "Multiuser OFDM with Adaptive Subcarrier, Bit and Power Allocation," IEEE J. Select. Areas Commun., Vol. 17(10), pp. 1747-1758, October 1999.

Within one cell, the subscribers can be coordinated to have different subcarriers in OFDMA. The signals for different subscribers can be made orthogonal and there is little intracell interference. However, with aggressive frequency reuse plan, e.g., the same spectrum is used for multiple neighboring cells, the problem of intercell interference arises. It is clear that the intercell interference in an OFDMA system is also frequency selective and it is advantageous to adaptively allocate the subcarriers so as to mitigate the effect of intercell interference.

One approach to subcarrier allocation for OFDMA is a joint optimization operation, not only requiring the activity and channel knowledge of all the subscribers in all the cells, but also requiring frequent rescheduling every time an existing subscriber is dropped off the network or a new subscriber is added onto the network. This is often impractical in real wireless system, mainly due to the bandwidth cost for updating the subscriber information and the computation cost for the joint optimization.

SUMMARY OF THE INVENTION

A method and apparatus for allocating subcarriers in an orthogonal frequency division multiple access (OFDMA) system is described. In one embodiment, the method comprises allocating at least one diversity cluster of subcarriers to a first subscriber and allocating at least one coherence cluster to a second subscriber.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
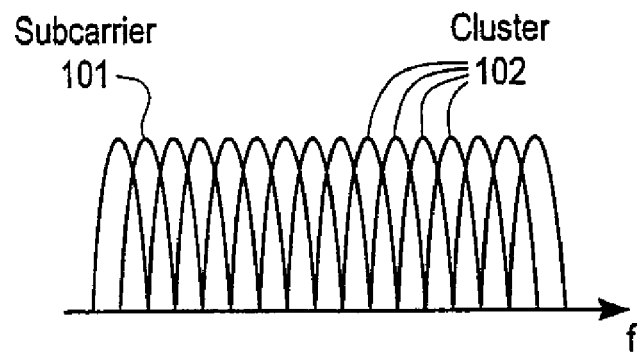
FIG. 1A illustrates subcarriers and clusters.

A method and apparatus for allocating subcarriers in an orthogonal frequency division multiple access (OFDMA) system is described. In one embodiment, the method comprises allocating at least one diversity cluster of subcarriers to a first subscriber and allocating at least one coherence cluster to a second subscriber.

The techniques disclosed herein are described using OFDMA (clusters) as an example. However, they are not limited to OFDMA-based systems. The techniques apply to multi-carrier systems in general, where, for example, a carrier can be a cluster in OFDMA, a spreading code in CDMA, an antenna beam in SDMA (space-division multiple access), etc. In one embodiment, subcarrier allocation is performed in each cell separately. Within each cell, the allocation for individual subscribers (e.g., mobiles) is also made progressively as each new subscriber is added to the system as opposed to joint allocation for subscribers within each cell in which allocation decisions are made taking into account all subscribers in a cell for each allocation.

For downlink channels, each subscriber first measures the channel and interference information for all the subcarriers and then selects multiple subcarriers with good performance (e.g., a high signal-to-interference plus noise ratio (SINR)) and feeds back the information on these candidate subcarriers to the base station. The feedback may comprise channel and interference information (e.g., signal-to-interference-plus-noise-ratio information) on all subcarriers or just a portion of subcarriers. In case of providing information on only a portion of the subcarriers, a subscriber may provide a list of subcarriers ordered starting with those subcarriers which the subscriber desires to use, usually because their performance is good or better than that of other subcarriers.

Upon receiving the information from the subscriber, the base station further selects the subcarriers among the candidates, utilizing additional information available at the base station, e.g., the traffic load information on each subcarrier, amount of traffic requests queued at the base station for each frequency band, whether frequency bands are overused, and/or how long a subscriber has been waiting to send information. In one embodiment, the subcarrier loading information of neighboring cells can also be exchanged between base stations. The base stations can use this information in subcarrier allocation to reduce inter-cell interference.

In one embodiment, the selection by the base station of the channels to allocate, based on the feedback, results in the selection of coding/modulation rates. Such coding/modulation rates may be specified by the subscriber when specifying subcarriers that it finds favorable to use. For example, if the SINR is less than a certain threshold (e.g., 12 dB), quadrature phase shift keying (QPSK) modulation is used; otherwise, 16 quadrature amplitude modulation (QAM) is used. Then the base station informs the subscribers about the subcarrier allocation and the coding/modulation rates to use.

In one embodiment, the feedback information for downlink subcarrier allocation is transmitted to the base station through the uplink access channel, which occurs in a short period every transmission time slot, e.g., 400 microseconds in every 10-millisecond time slot. In one embodiment, the access channel occupies the entire frequency bandwidth. Then the base station can collect the uplink SINR of each subcarrier directly from the access channel. The SINR as well as the traffic load information on the uplink subcarriers are used for uplink subcarrier allocation.

For either direction, the base station makes the final decision of subcarrier allocation for each subscriber.

In the following description, a procedure of selective subcarrier allocation is also disclosed, including methods of channel and interference sensing, methods of information feedback from the subscribers to the base station, and algorithms used by the base station for subcarrier selections.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Subcarrier Clustering

The techniques described herein are directed to subcarrier allocation for data traffic channels. In a cellular system, there are typically other channels, pre-allocated for the exchange of control information and other purposes. These channels often include down link and up link control channels, uplink access channels, and time and frequency synchronization channels.

FIG. 1A illustrates multiple subcarriers, such as subcarrier 101, and cluster 102. A cluster, such as cluster 102, is defined as a logical unit that contains at least one physical subcarrier, as shown in FIG. 1A. A cluster can contain consecutive or disjoint subcarriers. The mapping between a cluster and its subcarriers can be fixed or reconfigurable. In the latter case, the base station informs the subscribers when the clusters are redefined. In one embodiment, the frequency spectrum includes 512 subcarriers and each cluster includes four consecutive subcarriers, thereby resulting in 128 clusters.

An Exemplary Subcarrier/Cluster Allocation Procedure

Figure 1B:
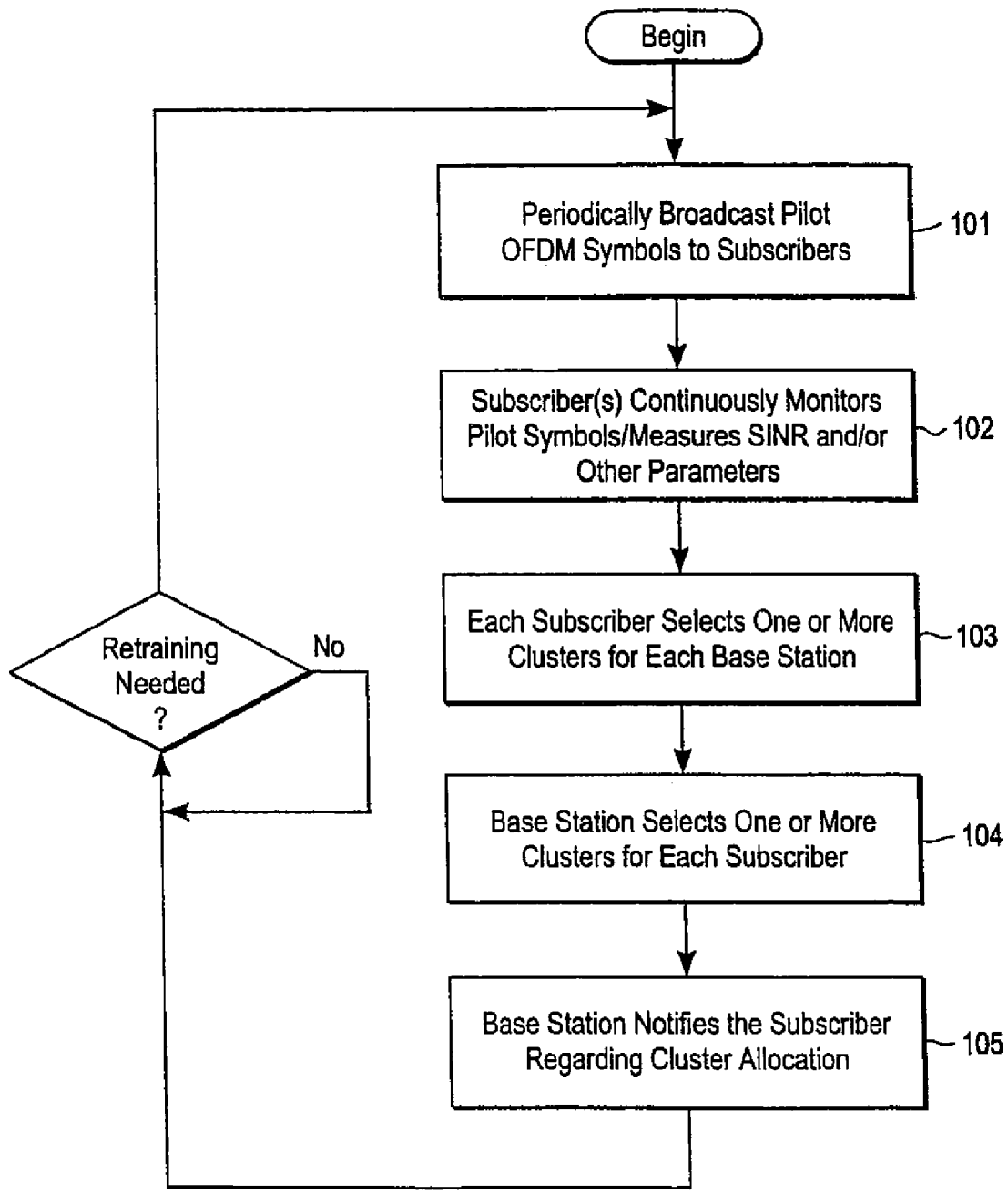
FIG. 1B is a flow diagram of one embodiment of a process for allocating subcarriers.

FIG. 1B is a flow diagram of one embodiment of a process for allocation clusters to subscribers. The process is performed by processing logic that may comprise hardware (e.g., dedicated logic, circuitry, etc.), software (such as that which runs on, for example, a general purpose computer system or dedicated machine), or a combination of both.

Referring to FIG. 1B, each base station periodically broadcasts pilot OFDM symbols to every subscriber within its cell (or sector) (processing block 101). The pilot symbols, often referred to as a sounding sequence or signal, are known to both the base station and the subscribers. In one embodiment, each pilot symbol covers the entire OFDM frequency bandwidth. The pilot symbols may be different for different cells (or sectors). The pilot symbols can serve multiple purposes: time and frequency synchronization, channel estimation and signal-to-interference/noise (SINR) ratio measurement for cluster allocation.

Next, each subscriber continuously monitors the reception of the pilot symbols and measures the SINR and/or other parameters, including inter-cell interference and intra-cell traffic, of each cluster (processing block 102). Based on this information, each subscriber selects one or more clusters with good performance (e.g., high SINR and low traffic loading) relative to each other and feeds back the information on these candidate clusters to the base station through predefined uplink access channels (processing block 103). For example, SINR values higher than 10 dB may indicate good performance. Likewise, a cluster utilization factor less than 50% may be indicative of good performance. Each subscriber selects the clusters with relatively better performance than others. The selection results in each subscriber selecting clusters they would prefer to use based on the measured parameters.

In one embodiment, each subscriber measures the SINR of each subcarrier cluster and reports these SINR measurements to their base station through an access channel. The SINR value may comprise the average of the SINR values of each of the subcarriers in the cluster. Alternatively, the SINR value for the cluster may be the worst SINR among the SINR values of the subcarriers in the cluster. In still another embodiment a weighted averaging of SINR values of the subcarriers in the cluster is used to generate an SINR value for the cluster. This may be particularly useful in diversity clusters where the weighting applied to the subcarriers may be different.

The feedback of information from each subscriber to the base station contains a SINR value for each cluster and also indicates the coding/modulation rate that the subscriber desires to use. No cluster index is needed to indicate which SINR value in the feedback corresponds to which cluster as long as the order of information in the feedback is known to the base station. In an alternative embodiment, the information in the feedback is ordered according to which clusters have the best performance relative to each other for the subscriber. In such a case, an index is needed to indicate to which cluster the accompanying SINR value corresponds.

Upon receiving the feedback from a subscriber, the base station further selects one or more clusters for the subscriber among the candidates (processing block 104). The base station may utilize additional information available at the base station, e.g., the traffic load information on each subcarrier, amount of traffic requests queued at the base station for each frequency band, whether frequency bands are overused, and how long a subscriber has been waiting to send information. The subcarrier loading information of neighboring cells can also be exchanged between base stations. The base stations can use this information in subcarrier allocation to reduce inter-cell interference.

After cluster selection, the base station notifies the subscriber about the cluster allocation through a downlink common control channel or through a dedicated downlink traffic channel if the connection to the subscriber has already been established (processing block 105). In one embodiment, the base station also informs the subscriber about the appropriate modulation/coding rates.

Once the basic communication link is established, each subscriber can continue to send the feedback to the base station using a dedicated traffic channel (e.g., one or more predefined uplink access channels).

In one embodiment, the base station allocates all the clusters to be used by a subscriber at once. In an alternative embodiment, the base station first allocates multiple clusters, referred to herein as the basic clusters, to establish a data link between the base station and the subscriber. The base station then subsequently allocates more clusters, referred to herein as the auxiliary clusters, to the subscriber to increase the communication bandwidth. Higher priorities can be given to the assignment of basic clusters and lower priorities may be given to that of auxiliary clusters. For example, the base station first ensures the assignment of the basic clusters to the subscribers and then tries to satisfy further requests on the auxiliary clusters from the subscribers. Alternatively, the base station may assign auxiliary clusters to one or more subscribers before allocating basic clusters to other subscribers. For example, a base station may allocate basic and auxiliary clusters to one subscriber before allocating any clusters to other subscribers. In one embodiment, the base station allocates basic clusters to a new subscriber and then determines if there are any other subscribers requesting clusters. If not, then the base station allocates the auxiliary clusters to that new subscriber.

From time to time, processing logic performs retraining by repeating the process described above (processing block 106). The retraining may be performed periodically. This retraining compensates for subscriber movement and any changes in interference. In one embodiment, each subscriber reports to the base station its updated selection of clusters and their associated SINRs. Then the base station further performs the reselection and informs the subscriber about the new cluster allocation. Retraining can be initiated by the base station, and in which case, the base station requests a specific subscriber to report its updated cluster selection. Retraining can also be initiated by the subscriber when it observes channel deterioration.

Adaptive Modulation and Coding

In one embodiment, different modulation and coding rates are used to support reliable transmission over channels with different SINR. Signal spreading over multiple subcarriers may also be used to improve the reliability at very low SINR.

An example coding/modulation table is given below in Table 1.

TABLE 1

| Scheme | Modulation | Code Rate |
|---|---|---|
| 0 | QPSK, ⅛ Spreading | ½ |
| 1 | QPSK, ¼ Spreading | ½ |
| 2 | QPSK, ½ Spreading | ½ |
| 3 | QPSK | ½ |
| 4 | 8PSK | ⅔ |
| 5 | 16QAM | ¾ |
| 6 | 64QAM | ⅚ |

In the example above, ⅛ spreading indicates that one QPSK modulation symbol is repeated over eight carriers. The repetition/spreading may also be extended to the time domain. For example, one QPSK symbol can be repeated over four subcarriers of two OFDM spreading.

The coding/modulation rate can be adaptively changed according to the channel conditions observed at the receiver after the initial cluster allocation and rate selection.

Pilot Symbols and SINR Measurement

Figure 2:
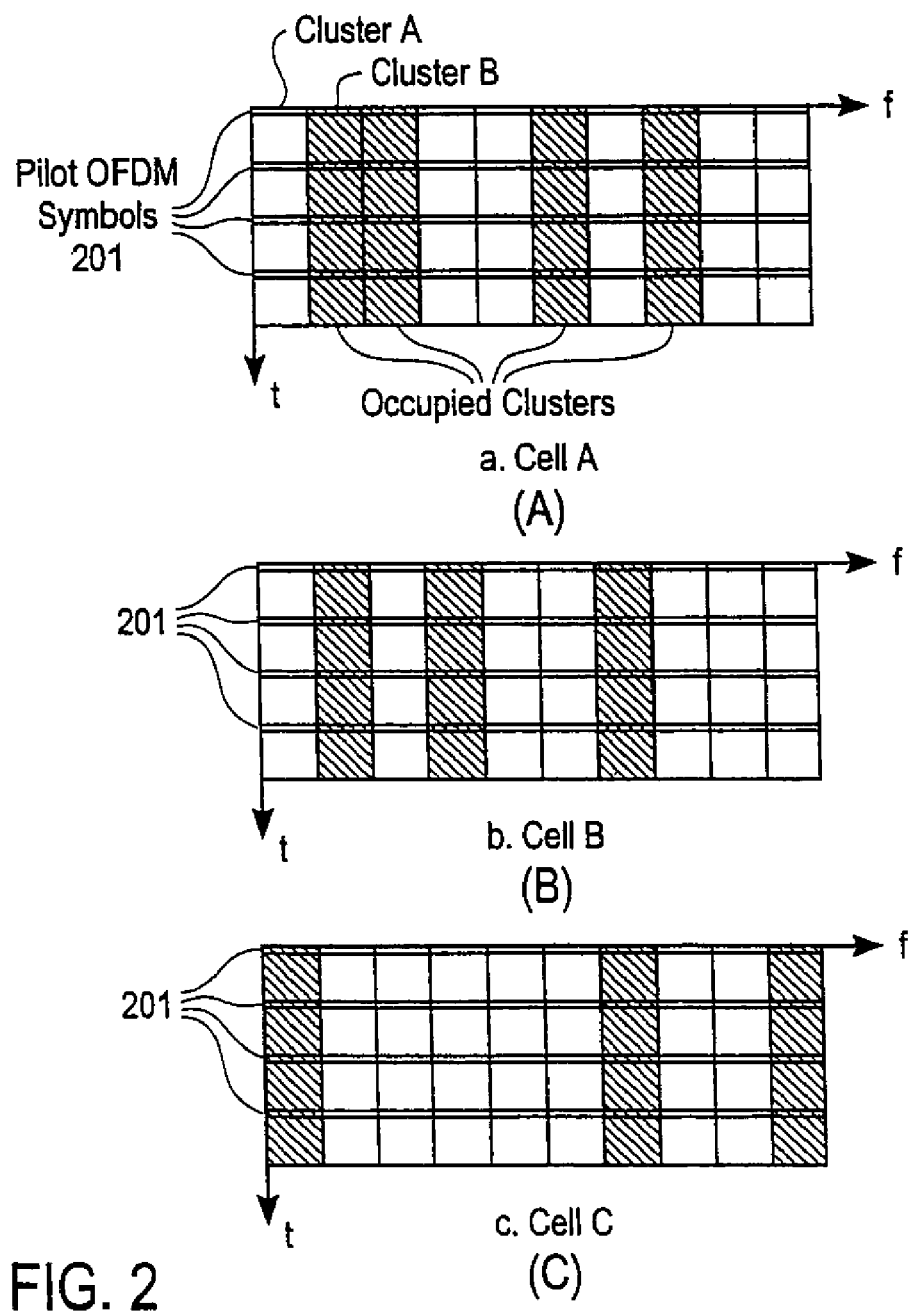
FIG. 2 illustrates time and frequency grid of OFDM symbols, pilots and clusters.

In one embodiment, each base station transmits pilot symbols simultaneously, and each pilot symbol occupies the entire OFDM frequency bandwidth, as shown in FIGS. 2A-C. Referring to FIGS. 2A-C, pilot symbols 201 are shown traversing the entire OFDM frequency bandwidth for cells A, B and C, respectively. In one embodiment, each of the pilot symbols have a length or duration of 128 microseconds with a guard time, the combination of which is approximately 152 microseconds. After each pilot period, there are a predetermined number of data periods followed by another set of pilot symbols. In one embodiment, there are four data periods used to transmit data after each pilot, and each of the data periods is 152 microseconds.

A subscriber estimates the SINR for each cluster from the pilot symbols. In one embodiment, the subscriber first estimates the channel response, including the amplitude and phase, as if there is no interference or noise. Once the channel is estimated, the subscriber calculates the interference/noise from the received signal.

The estimated SINR values may be ordered from largest to smallest SINRs and the clusters with large SINR values are selected. In one embodiment, the selected clusters have SINR values that are larger than the minimum SINR which still allows a reliable (albeit low-rate) transmission supported by the system. The number of clusters selected may depend on the feedback bandwidth and the request transmission rate. In one embodiment, the subscriber always tries to send the information about as many clusters as possible from which the base station chooses.

The estimated SINR values are also used to choose the appropriate coding/modulation rate for each cluster as discussed above. By using an appropriate SINR indexing scheme, an SINR index may also indicate a particular coding and modulation rate that a subscriber desires to use. Note that even for the same subscribers, different clusters can have different modulation/coding rates.

Pilot symbols serve an additional purpose in determining interference among the cells. Since the pilots of multiple cells are broadcast at the same time, they will interfere with each other (because they occupy the entire frequency band). This collision of pilot symbols may be used to determine the amount of interference as a worst case scenario. Therefore, in one embodiment, the above SINR estimation using this method is conservative in that the measured interference level is the worst-case scenario, assuming that all the interference sources are on. Thus, the structure of pilot symbols is such that it occupies the entire frequency band and causes collisions among different cells for use in detecting the worst case SINK in packet transmission systems.

During data traffic periods, the subscribers can determine the level of interference again. The data traffic periods are used to estimate the intra-cell traffic as well as the inter-cell interference level. Specifically, the power difference during the pilot and traffic periods may be used to sense the (intra-cell) traffic loading and inter-cell interference to select the desirable clusters.

The interference level on certain clusters may be lower, because these clusters may be unused in the neighboring cells. For example, in cell A, with respect to cluster A there is less interference because cluster A is unused in cell B (while it is used in cell C). Similarly, in cell A, cluster B will experience lower interference from cell B because cluster B is used in cell B but not in cell C.

The modulation/coding rate based on this estimation is robust to frequent interference changes resulted from bursty packet transmission. This is because the rate prediction is based on the worst case situation in which all interference sources are transmitting.

In one embodiment, a subscriber utilizes the information available from both the pilot symbol periods and the data traffic periods to analyze the presence of both the intra-cell traffic load and inter-cell interference. The goal of the subscriber is to provide an indication to the base station as to those clusters that the subscriber desires to use. Ideally, the result of the selection by the subscriber is clusters with high channel gain, low interference from other cells, and high availability. The subscriber provides feedback information that includes the results, listing desired clusters in order or not as described herein.

Figure 3:
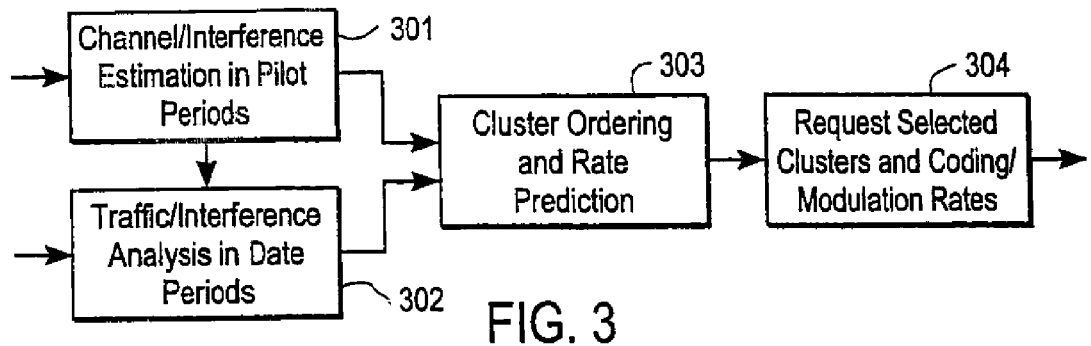
FIG. 3 illustrates subscriber processing.

FIG. 3 illustrates one embodiment of subscriber processing. The processing is performed by processing logic that may comprise hardware (e.g., dedicated logic, circuitry, etc.), software (such as that which runs on, for example, a general purpose computer system or dedicated machine), or a combination of both.

Referring to FIG. 3, channel/interference estimation processing block 301 performs channel and interference estimation in pilot periods in response to pilot symbols. Traffic/interference analysis processing block 302 performs traffic and interference analysis in data periods in response to signal information and information from channel/interference estimation block 301.

Cluster ordering and rate prediction processing block 303 is coupled to outputs of channel/interference estimation processing block 301 and traffic/interference analysis processing block 302 to perform cluster ordering and selection along with rate prediction.

The output of cluster ordering processing block 303 is input to cluster request processing block 304, which requests clusters and modulation/coding rates. Indications of these selections are sent to the base station. In one embodiment, the SINR on each cluster is reported to the base station through an access channel. The information is used for cluster selection to avoid clusters with heavy intra-cell traffic loading and/or strong interference from other cells. That is, a new subscriber may not be allocated use of a particular cluster if heavy intra-cell traffic loading already exists with respect to that cluster. Also, clusters may not be allocated if the interference is so strong that the SINR only allows for low-rate transmission or no reliable transmission at all.

The channel/interference estimation by processing block 301 is well-known in the art by monitoring the interference that is generated due to full-bandwidth pilot symbols being simultaneously broadcast in multiple cells. The interface information is forwarded to processing block 302 which uses the information to solve the following equation:

$$H_i S_i + I_i + n_i = y_i$$

where $S_i$ represents the signal for subcarrier (freq. band) i, $I_i$ is the interference for subcarrier i, $n_i$ is the noise associated with subcarrier i, and y is the observation for subcarrier i. In the case of 512 subcarriers, i may range from 0 to 511. The $I_i$ and $n_i$ are not separated and may be considered one quantity. The interference/noise and channel gain $H_i$ are not known. During pilot periods, the signal $S_i$ representing the pilot symbols, and the observation $y_i$ are knowns, thereby allowing determination of the channel gain $H_i$ for the case where there is no interference or noise. Once this is known, it may be plugged back into the equation to determine the interference/noise during data periods since $H_i$, $S_i$ and $y_i$ are all known.

The interference information from processing blocks 301 and 302 are used by the subscriber to select desirable clusters. In one embodiment, using processing block 303, the subscriber orders clusters and also predicts the data rate that would be available using such clusters. The predicted data rate information may be obtained from a look up table with precalculated data rate values. Such a look up table may store the pairs of each SINR and its associated desirable transmission rate. Based on this information, the subscriber selects clusters that it desires to use based on predetermined performance criteria. Using the ordered list of clusters, the subscriber requests the desired clusters along with coding and modulation rates known to the subscriber to achieve desired data rates.

Figure 4:
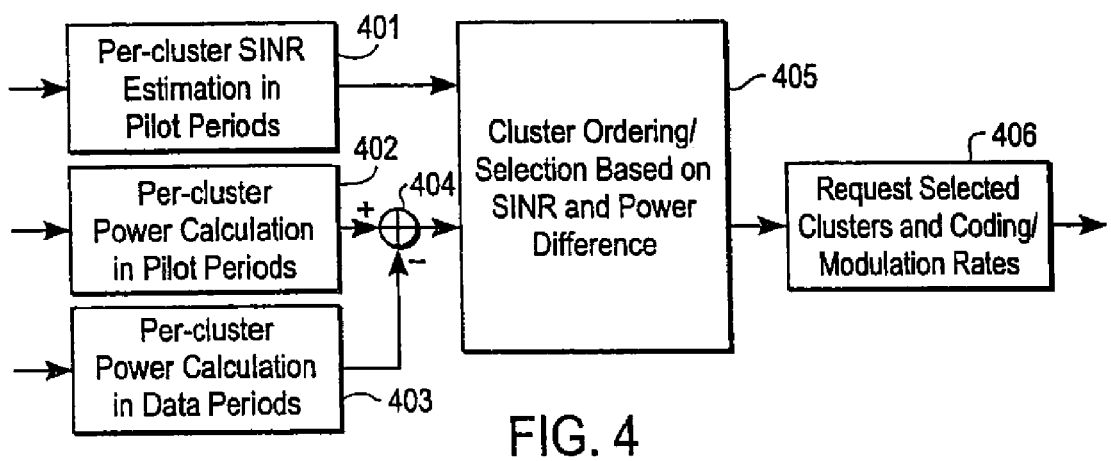
FIG. 4 illustrates one example of FIG. 3.

FIG. 4 is one embodiment of an apparatus for the selection of clusters based on power difference. The approach uses information available during both pilot symbol periods and data traffic periods to perform energy detection. The processing of FIG. 4 may be implemented in hardware, (e.g., dedicated logic, circuitry, etc.), software (such as is run on, for example, a general purpose computer system or dedicated machine), or a combination of both.

Referring to FIG. 4, a subscriber includes SINR estimation processing block 401 to perform SINR estimation for each cluster in pilot periods, power calculation processing block 402 to perform power calculations for each cluster in pilot periods, and power calculation processing block 403 to perform power calculations in data periods for each cluster. Subtractor 404 subtracts the power calculations for data periods from processing block 403 from those in pilot periods from processing block 402. The output of subtractor 404 is input to power difference ordering (and group selection) processing block 405 that performs cluster ordering and selection based on SINR and the power difference between pilot periods and data periods. Once the clusters have been selected, the subscriber requests the selected clusters and the coding/modulation rates with processing block 406.

More specifically, in one embodiment, the signal power of each cluster during the pilot periods is compared with that during the traffic periods, according to the following:

$$P_P = P_S + P_I + P_{N'}$$

$$P_D = \begin{cases} P_N, & \text{with no signal and interference} \\ P_S + P_N, & \text{with signal only} \\ P_I + P_N, & \text{with interference only} \\ P_S + P_I + P_N, & \text{with both signal and interference} \end{cases}$$

$$P_P - P_D = \begin{cases} P_S + P_I, & \text{with no signal and interference} \\ P_I, & \text{with signal only} \\ P_S, & \text{with interference only} \\ O, & \text{with both signal and interference} \end{cases}$$

where $P_P$ is the measured power corresponding to each cluster during pilot periods, $P_D$ is the measured power during the traffic periods, $P_S$ is the signal power, $P_I$ is the interference power, and $P_N$ is the noise power.

In one embodiment, the subscriber selects clusters with relatively large $P_P/(P_P-P_D)$ (e.g., larger than a threshold such as 10 dB) and avoids clusters with low $P_P/(P_P-P_D)$ (e.g., lower than a threshold such as 10 dB) when possible.

Alternatively, the difference may be based on the energy difference between observed samples during the pilot period and during the data traffic period for each of the subcarriers in a cluster such as the following:

$$\Delta_i = |y_i^P| - |y_i^D|$$

Thus, the subscriber sums the differences for all subcarriers.

Depending on the actual implementation, a subscriber may use the following metric, a combined function of both SINR and $P_P-P_D$, to select the clusters:

$$\beta = f(\text{SINR}, P_P/(P_P-P_D))$$

where $f$ is a function of the two inputs. One example of $f$ is weighted averaging (e.g., equal weights). Alternatively, a subscriber selects a cluster based on its SINR and only uses the power difference $P_P-P_D$ to distinguish clusters with similar SINR. The difference may be smaller than a threshold (e.g., 1 dB).

Both the measurement of SINR and $P_P-P_D$ can be averaged over time to reduce variance and improve accuracy. In one embodiment, a moving-average time window is used that is long enough to average out the statistical abnormity yet short enough to capture the time-varying nature of channel and interference, e.g., 1 millisecond.

Feedback Format for Downlink Cluster Allocation

Figure 5:
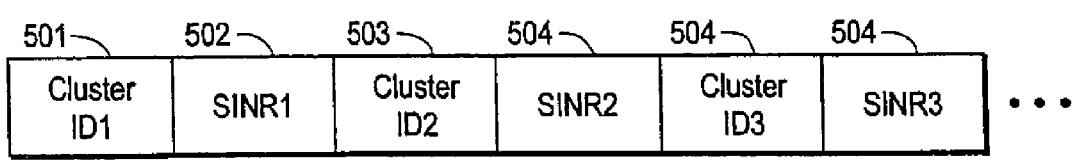
FIG. 5 illustrates one embodiment of a format for arbitrary cluster feedback.

In one embodiment, for the downlink, the feedback contains both the indices of selected clusters and their SINR. An exemplary format for arbitrary cluster feedback is shown in FIG. 5. Referring to FIG. 5, the subscriber provides a cluster index (ID) to indicate the cluster and its associated SINR value. For example, in the feedback, the subscriber provides cluster ID1 (501) and the SINR for the cluster, SINR1 (502), cluster ID2 (503) and the SINR for the cluster, SINR2 (504), and cluster ID3 (505), and the SINR for the cluster, SINR3 (506), etc. The SINR for the cluster may be created using an average of the SINRs of the subcarriers. Thus, multiple arbitrary clusters can be selected as the candidates. As discussed above, the selected clusters can also be ordered in the feedback to indicate priority. In one embodiment, the subscriber may form a priority list of clusters and sends back the SINR information in a descending order of priority.

Typically, an index to the SINR level, instead of the SINR itself is sufficient to indicate the appropriate coding/modulation for the cluster. For example, a 3-bit field can be used for SINK indexing to indicate 8 different rates of adaptive coding/modulation.

An Exemplary Base Station

The base station assigns desirable clusters to the subscriber making the request. In one embodiment, the availability of the cluster for allocation to a subscriber depends on the total traffic load on the cluster. Therefore, the base station selects the clusters not only with high SINR, but also with low traffic load.

Figure 13:
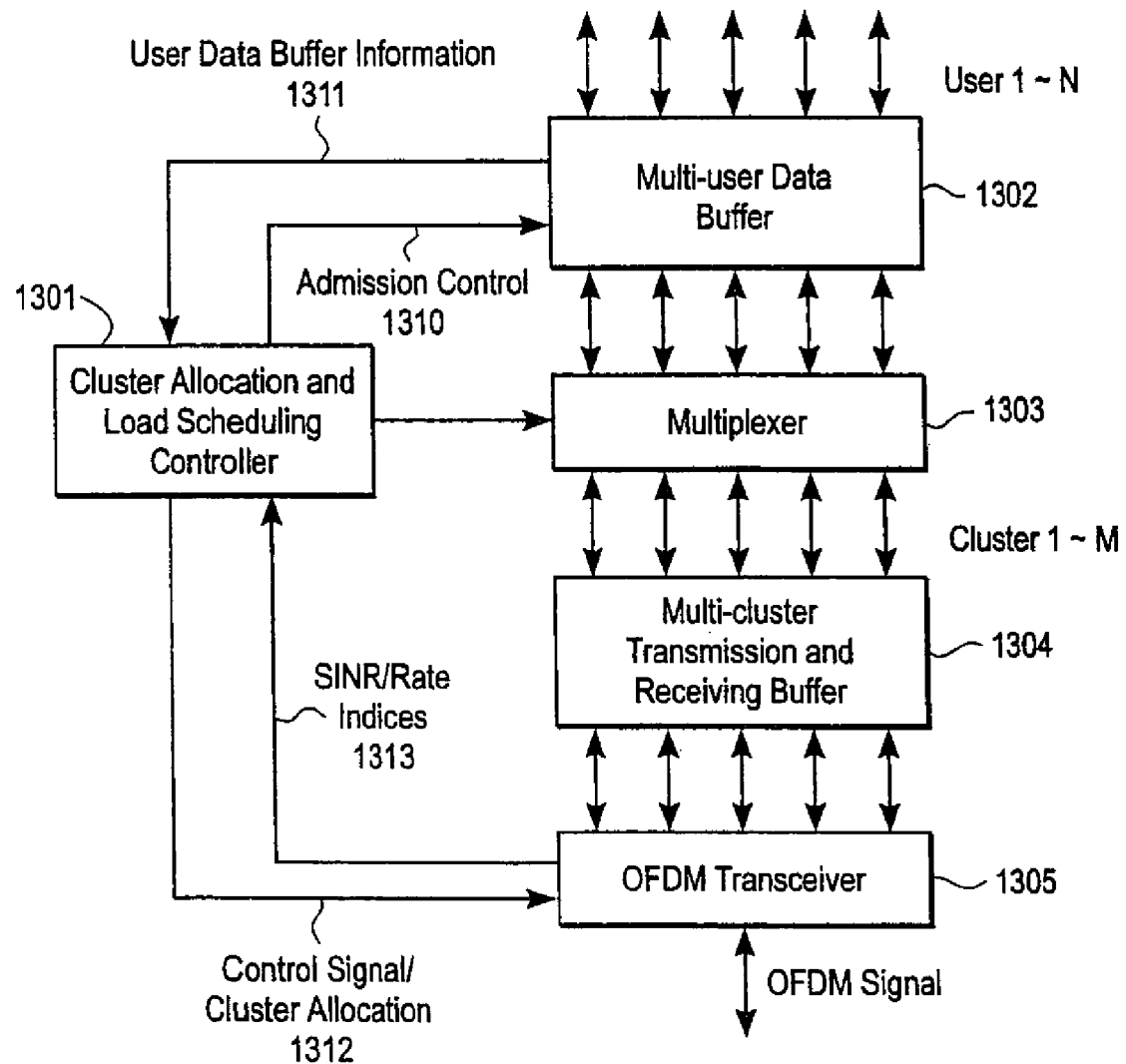
FIG. 13 illustrates one embodiment of a base station.

FIG. 13 is a block diagram of one embodiment of a base station. Referring to FIG. 13, cluster allocation and load scheduling controller 1301 (cluster allocator) collects all the necessary information, including the downlink/uplink SINR of clusters specified for each subscriber (e.g., via SINR/rate indices signals 1313 received from OFDM transceiver 1305) and user data, queue fullness/traffic load (e.g., via user data buffer information 1311 from multi-user data buffer 1302). Using this information, controller 1301 makes the decision on cluster allocation and load scheduling for each user, and stores the decision information in a memory (not shown). Controller 1301 informs the subscribers about the decisions through control signal channels (e.g., control signal/cluster allocation 1312 via OFDM transceiver 1305). Controller 1301 updates the decisions during retraining.

In one embodiment, controller 1301 also performs admission control to user access since it knows the traffic load of the system. This may be performed by controlling user data buffers 1302 using admission control signals 1310.

The packet data of User 1~N are stored in the user data buffers 1302. For downlink, with the control of controller 1301, multiplexer 1303 loads the user data to cluster data buffers (for Cluster 1~M) waiting to be transmitted. For the uplink, multiplexer 1303 sends the data in the cluster buffers to the corresponding user buffers. Cluster buffer 1304 stores the signal to be transmitted through OFDM transceiver 1305 (for downlink) and the signal received from transceiver 1305. In one embodiment, each user might occupy multiple clusters and each cluster might be shared by multiple users (in a time-division-multiplexing fashion).

Group-Based Cluster Allocation

Figure 6:
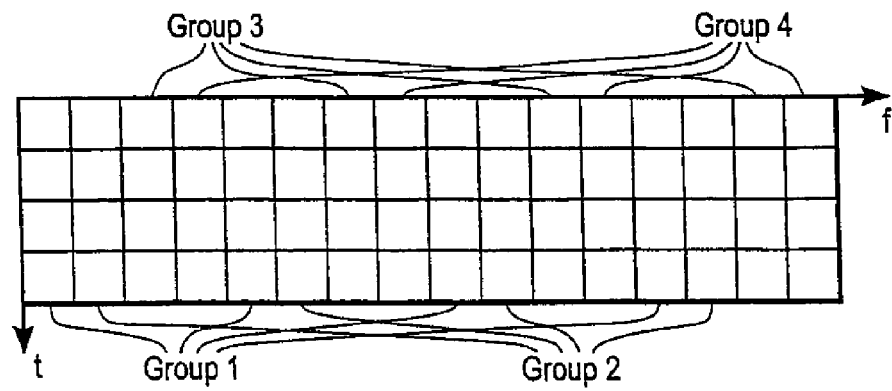
FIG. 6 illustrates one embodiment of a partition the clusters into groups.

In another embodiment, for the downlink, the clusters are partitioned into groups. Each group can include multiple clusters. FIG. 6 illustrates an exemplary partitioning. Referring to FIG. 6, groups 1-4 are shown with arrows pointing to clusters that are in each group as a result of the partitioning. In one embodiment, the clusters within each group are spaced far apart over the entire bandwidth. In one embodiment, the clusters within each group are spaced apart farther than the channel coherence bandwidth, i.e. the bandwidth within which the channel response remains roughly the same. A typical value of coherence bandwidth is 100 kHz for many cellular systems. This improves frequency diversity within each group and increases the probability that at least some of the clusters within a group can provide high SINR. The clusters may be allocated in groups.

Goals of group-based cluster allocation include reducing the data bits for cluster indexing, thereby reducing the bandwidth requirements of the feedback channel (information) and control channel (information) for cluster allocation. Group-based cluster allocation may also be used to reduce inter-cell interference.

After receiving the pilot signal from the base station, a subscriber sends back the channel information on one or more cluster groups, simultaneously or sequentially. In one embodiment, only the information on some of the groups is sent back to the base station. Many criteria can be used to choose and order the groups, based on the channel information, the inter-cell interference levels, and the intra-cell traffic load on each cluster.

Figures 7, 8:
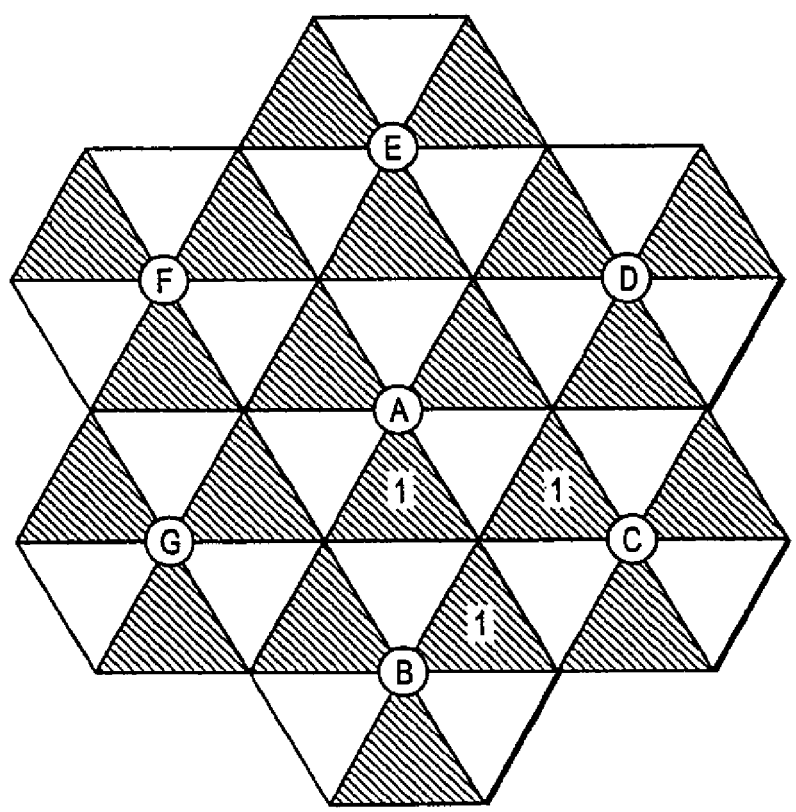
FIG. 7 illustrates one embodiment of a feedback format for group-based cluster allocation.
FIG. 8 illustrates frequency reuse and interference in a multi-cell, multi-sector network.

In one embodiment, a subscriber first selects the group with the best overall performance and then feedbacks the SINR information for the clusters in that group. The subscriber may order the groups based on their number of clusters for which the SINR is higher than a predefined threshold. By transmitting the SINR of all the clusters in the group sequentially, only the group index, instead of all the cluster indices, needs to be transmitted. Thus, the feedback for each group generally contains two types of information: the group index and the SINR value of each cluster within the group. FIG. 7 illustrates an exemplary format for indicating a group-based cluster allocation. Referring to FIG. 7, a group ID, ID1, is followed by the SINR values for each of the clusters in the group. This can significantly reduce the feedback overhead.

Upon receiving the feedback information from the subscriber, the cluster allocator at the base station selects multiple clusters from one or more groups, if available, and then assigns the clusters to the subscriber. This selection may be performed by an allocation in a media access control portion of the base station.

Furthermore, in a multi-cell environment, groups can have different priorities associated with different cells. In one embodiment, the subscriber's selection of a group is biased by the group priority, which means that certain subscribers have higher priorities on the usage of some groups than the other subscribers.

In one embodiment, there is no fixed association between one subscriber and one cluster group; however, in an alternative embodiment there may be such a fixed association. In an implementation having a fixed association between a subscriber and one or more cluster groups, the group index in the feedback information can be omitted, because this information is known to both subscriber and base station by default.

In another embodiment, the pilot signal sent from the base station to the subscriber also indicates the availability of each cluster, e.g., the pilot signal shows which clusters have already been allocated for other subscribers and which clusters are available for new allocations. For example, the base station can transmit a pilot sequence 1111 1111 on the subcarriers of a cluster to indicate that the cluster is available, and 1111-1-1-1-1 to indicate the cluster is not available. At the receiver, the subscriber first distinguishes the two sequences using the signal processing methods which are well known in the art, e.g., the correlation methods, and then estimates the channel and interference level.

With the combination of this information and the channel characteristics obtained by the subscriber, the subscriber can prioritize the groups to achieve both high SINR and good load balancing.

In one embodiment, the subscriber protects the feedback information by using error correcting codes. In one embodiment, the SINR information in the feedback is first compressed using source coding techniques, e.g., differential encoding, and then encoded by the channel codes.

FIG. 8 shows one embodiment of a frequency reuse pattern for an exemplary cellular set up. Each cell has hexagonal structure with six sectors using directional antennas at the base stations. Between the cells, the frequency reuse factor is one. Within each cell, the frequency reuse factor is 2 where the sectors use two frequencies alternatively. As shown in FIG. 8, each shaded sector uses half of the available OFDMA clusters and each unshaded sector uses the other half of the clusters. Without loss of generality, the clusters used by the shaded sectors are referred to herein as odd clusters and those used by the unshaded sectors are referred to herein as even clusters.

Consider the downlink signaling with omni-directional antennas at the subscribers. From FIG. 8, it is clear that for the downlink in the shaded sectors, Cell A interferes with Cell B, which in turn interferes with Cell C, which in turn interferes with Cell A, namely, A->B->C->A. For the unshaded sectors, Cell A interferes with Cell C, which in turn interferes with Cell B, which in turn interferes with Cell A, namely, A->C->B->A.

Sector A1 receives interference from Sector C1, but its transmission interferes with Sector B1. Namely, its interference source and the victims with which it interferes are not the same. This might cause a stability problem in a distributed cluster-allocation system using interference avoidance: if a frequency cluster is assigned in Sector B1 but not in Sector C1, the cluster may be assigned in A1 because it may be seen as clean in A1. However, the assignment of this cluster A1 can cause interference problem to the existing assignment in B1.

In one embodiment, different cluster groups are assigned different priorities for use in different cells to alleviate the aforementioned problem when the traffic load is progressively added to a sector. The priority orders are jointly designed such that a cluster can be selectively assigned to avoid interference from its interference source, while reducing, and potentially minimizing, the probability of causing interference problem to existing assignments in other cells.

Using the aforementioned example, the odd clusters (used by the shaded sectors) are partitioned into 3 groups: Group 1,2,3. The priority orders are listed in Table 2.

TABLE 2

Priority ordering for the downlink of the shaded sectors.Table

| Priority Ordering | Cell A | Cell B | Cell C |
| --- | --- | --- | --- |
| 1 | Group 1 | Group 3 | Group 2 |
| 2 | Group 2 | Group 1 | Group 3 |
| 3 | Group 3 | Group 2 | Group 1 |

Consider Sector A1. First, the clusters in Group 1 are selectively assigned. If there are still more subscribers demanding clusters, the clusters in Group 2 are selectively assigned to subscribers, depending on the measured SINR (avoiding the clusters receiving strong interference from Sector C1). Note that the newly assigned clusters from Group 2 to Sector A1 shall not cause interference problem in Sector B1, unless the load in Sector B1 is so heavy that the clusters in both Group 3 and 1 are used up and the clusters in Group 2 are also used. Table 3 shows the cluster usage when less than ⅔ of all the available clusters are used in Sector A1, B1, and C1.

TABLE 3

Cluster usage for the downlink of the shaded sectors with less than ⅔ of the full load.

| Cluster Usage | Cell A | Cell B | Cell C |
| --- | --- | --- | --- |
| 1 | Group 1 | Group 3 | Group 2 |
| 2 | Group 2 | Group 1 | Group 3 |
| 3 | | | |

Table 4 shows the priority orders for the unshaded sectors, which are different from those for the shaded sectors, since the interfering relationship is reversed.

TABLE 4

Priority ordering for the downlink of the unshaded sectors.

| Priority Ordering | Cell A | Cell B | Cell C |
| --- | --- | --- | --- |
| 1 | Group 1 | Group 2 | Group 3 |
| 2 | Group 2 | Group 3 | Group 1 |
| 3 | Group 3 | Group 1 | Group 2 |

Intelligent Switching between Coherence and Diversity Clusters

In one embodiment, there are two categories of clusters: coherence clusters, containing multiple subcarriers close to each other and diversity clusters, containing multiple subcarriers with at least some of the subcarriers spread far apart over the spectrum. The closeness of the multiple subcarriers in coherence clusters is preferably within the channel coherence bandwidth, i.e. the bandwidth within which the channel response remains roughly the same, which is typically within 100 kHz for many cellular systems. On the other hand, the spread of subcarriers in diversity clusters is preferably larger than the channel coherence bandwidth, typically within 100 kHz for many cellular systems. Of course, the larger the spread, the better the diversity. Therefore, a general goal in such cases is to maximize the spread.

Figure 9:
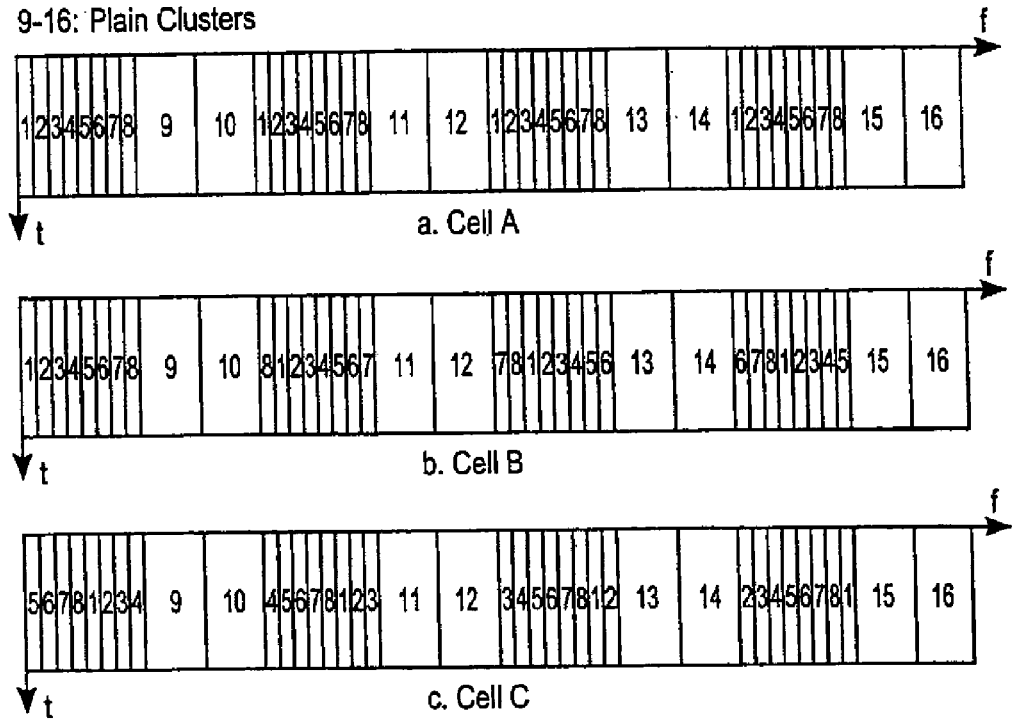
FIG. 9 illustrates different cluster formats for coherence clusters and diversity clusters.

FIG. 9 illustrates exemplary cluster formats for coherence clusters and diversity clusters for Cells A-C. Referring to FIG. 9, for cells A-C, the labeling of frequencies (subcarriers) indicates whether the frequencies are part of coherence or diversity clusters. For example, those frequencies labeled 1-8 are diversity clusters and those labeled 9-16 are coherence clusters. For example, all frequencies labeled 1 in a cell are part of one diversity cluster, all frequencies labeled 2 in a cell are part of another diversity cluster, etc., while the group of frequencies labeled 9 are one coherence cluster, the group of frequencies labeled 10 are another coherence cluster, etc. The diversity clusters can be configured differently for different cells to reduce the effect of inter-cell interference through interference averaging.

FIG. 9 shows example cluster configurations for three neighboring cells. The interference from a particular cluster in one cell are distributed to many clusters in other cells, e.g., the interference from Cluster 1 in Cell A are distributed to Cluster 1, 8, 7, 6 in Cell B. This significantly reduces the interference power to any particular cluster in Cell B. Likewise, the interference to any particular cluster in one cell comes from many different clusters in other cells. Since not all clusters are strong interferers, diversity clusters, with channel coding across its subcarriers, provide interference diversity gain. Therefore, it is advantageous to assign diversity clusters to subscribers that are close (e.g., within the coherent bandwidth) to the cell boundaries and are more subject to inter-cell interference.

Since the subcarriers in a coherence cluster are consecutive or close (e.g., within the coherent bandwidth) to each other, they are likely within the coherent bandwidth of the channel fading. Therefore, the channel gain of a coherence cluster can vary significantly and cluster selection can greatly improve the performance. On the other hand, the average channel gain of a diversity cluster has less of a degree of variation due to the inherent frequency diversity among the multiple subcarriers spread over the spectrum. With channel coding across the subcarriers within the cluster, diversity clusters are more robust to cluster mis-selection (by the nature of diversification itself), while yielding possibly less gain from cluster selection. Channel coding across the subcarriers means that each codeword contains bits transmitted from multiple subcarriers, and more specifically, the difference bits between codewords (error vector) are distributed among multiple subcarriers.

More frequency diversity can be obtained through subcarrier hopping over time in which a subscriber occupies a set of subcarriers at one time slot and another different set of subcarriers at a different time slot. One coding unit (frame) contains multiple such time slots and the transmitted bits are encoded across the entire frame.

Figure 10:
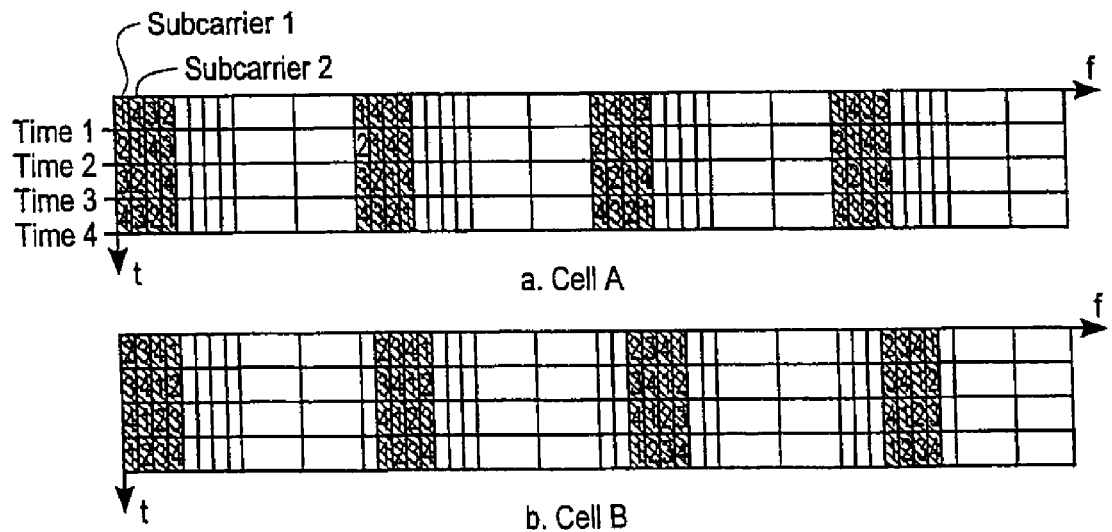
FIG. 10 illustrates diversity clusters with subcarrier hopping.

FIG. 10 illustrates diversity cluster with subcarrier hopping. Referring to FIG. 10, there are four diversity clusters in each of cells A and B shown, with each subcarrier in individual diversity clusters having the same label (1, 2, 3, or 4). There are four separate time slots shown and during each of the time slots, the subcarriers for each of the diversity clusters change. For example, in cell A, subcarrier 1 is part of diversity cluster 1 during time slot 1, is part of diversity cluster 2 during time slot 2, is part of diversity cluster 3 during time slot 3, and is part of diversity cluster 4 during time slot 4. Thus, more interference diversity can be obtained through subcarrier hopping over time, with further interference diversity achieved by using different hopping patterns for different cells, as shown in FIG. 10.

The manner in which the subscriber changes the subcarriers (hopping sequences) can be different for different cells in order to achieve better interference averaging through coding.

For static subscribers, such as in fixed wireless access, the channels change very little over time. Selective cluster allocation using the coherence clusters achieves good performance. On the other hand, for mobile subscribers, the channel time variance (the variance due to changes in the channel over time) can be very large. A high-gain cluster at one time can be in deep fade at another. Therefore, cluster allocation needs to be updated at a rapid rate, causing significant control overhead. In this case, diversity clusters can be used to provide extra robustness and to alleviate the overhead of frequent cluster reallocation. In one embodiment, cluster allocation is performed faster than the channel changing rate, which is often measured by the channel Doppler rate (in Hz), i.e. how many cycles the channel changes per second where the channel is completely different after one cycle. Note that selective cluster allocation can be performed on both coherence and diversity clusters.

In one embodiment, for cells containing mixed mobile and fixed subscribers, a channel/interference variation detector can be implemented at either the subscriber or the base station, or both. Using the detection results, the subscriber and the base station intelligently selects diversity clusters to mobile subscribers or fixed subscribers at cell boundaries, and coherence clusters to fixed subscribers close to the base station. The channel/interference variation detector measures the channel (SINR) variation from time to time for each cluster. For example, in one embodiment, the channel/interference detector measures the power difference between pilot symbols for each cluster and averages the difference over a moving window (e.g., 4 time slots). A large difference indicates that channel/interference changes frequently and subcarrier allocation may be not reliable. In such a case, diversity clusters are more desirable for the subscriber.

Figure 11:
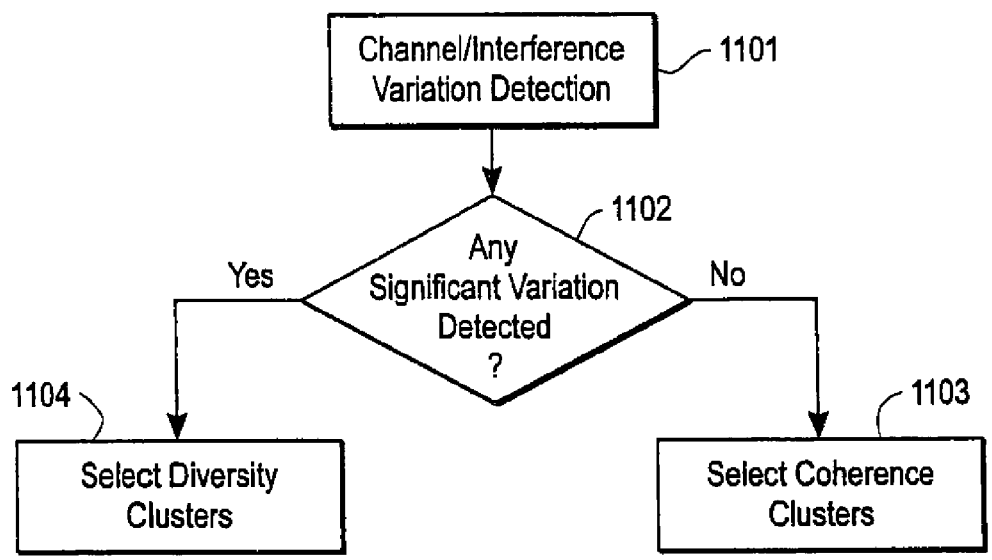
FIG. 11 illustrates intelligent switching between diversity clusters and coherence clusters depending on subscribers mobility.

FIG. 11 is a flow diagram of one embodiment of a process for intelligent selection between diversity clusters and coherence clusters depending on subscribers mobility. The process is performed by processing logic that may comprise hardware (e.g., circuitry, dedicated logic, etc.), software (such as that which runs on, for example, a general purpose computer system or dedicated machine), or a combination of both.

Referring to FIG. 11, processing logic in the base station performs channel/interference variation detection (processing block 1101). Processing logic then tests whether the results of the channel/interference variation detection indicate that the user is mobile or in a fixed position close to the edge of the cell (processing block 1102). If the user is not mobile or is not in a fixed position close to the edge of the cell, processing transitions to processing block 1103 where processing logic in the base station selects coherence clusters; otherwise, processing transitions to processing block 1104 in which processing logic in the base station selects diversity clusters.

In one embodiment, the base station determines whether a subscriber is mobile or fixed by detecting a rate of change of pilot signals, or the normalized channel variation, and determining that the rate of change is greater than a predetermined threshold. The normalized instantaneous difference between channels may be represented as $$\frac{|H_i - H_{i+1}|^2}{|H_i|^2},$$

where $H_i$ represents the channel and i is the index to represent the individual channels.

The threshold is system dependent. For example, the rate of change is greater than 10% (although any precentage (e.g., 20%) could be used), then the base station concludes that the subscriber is mobile. In one embodiment, if the constant period in signaling is not greater than a multiple of the round trip delay (e.g., 5 times the round trip delay), then the base station determines that the subscriber is mobile and allocates diversity clusters; otherwise, the base station allocates coherence clusters.

The selection can be updated and intelligently switched during retraining.

Figure 12:
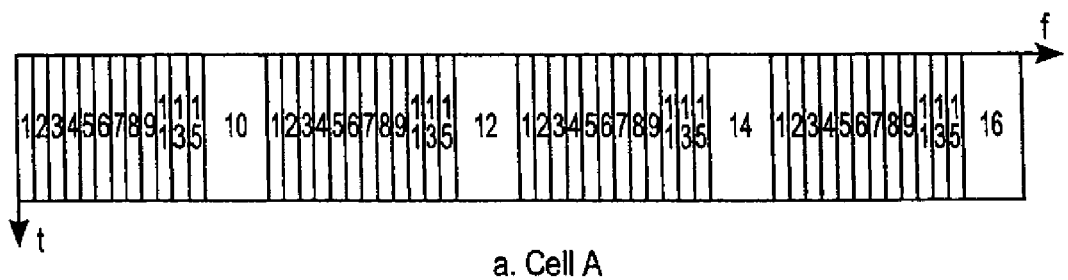
FIG. 12 illustrates one embodiment of a reconfiguration of cluster classification.

The ratio/allocation of the numbers of coherence and diversity clusters in a cell depends on the ratio of the population of mobile and fixed subscribers. When the population changes as the system evolves, the allocation of coherence and diversity clusters can be reconfigured to accommodate the new system needs. FIG. 12 illustrates a reconfiguration of cluster classification which can support more mobile subscribers than that in FIG. 9.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

The invention claimed is:

1. A method for reducing inter-cell interference in an OFDMA system, the method comprising:
   determining first subcarrier loading information for a first cell at a first OFDMA base station;
   receiving second subcarrier loading information for a second cell from a second OFDMA base station, wherein the second cell is a neighboring cell to the first cell; and
   allocating one or more subcarriers for use in the first cell based at least partially on the first subcarrier loading information and the second subcarrier loading information.

2. The method of claim 1, comprising transmitting the first subcarrier loading information to a third OFDMA base station.

3. The method of claim 2, wherein transmitting the first subcarrier loading information to the third OFDMA base station comprises transmitting the first subcarrier loading information to the third OFDMA base station located in a third cell neighboring the first cell.

4. The method of claim 1, comprising notifying a subscriber in the first cell of the one or more allocated subcarriers.

5. The method of claim 1, comprising:
    determining loading characteristics for one or more frequency bands, wherein the allocating comprises allocating the one or more subcarriers based at least partially on the determined loading characteristics.

6. The method of claim 5, wherein the allocating comprises selecting the one or more subcarriers from the frequency band with lowest loading characteristic.

7. The method of claim 5, wherein determining the loading characteristics for the one or more frequency bands comprises determining the loading characteristics for a sector within the first cell, wherein the sector comprises less than the entirety of the first cell.

8. An OFDMA wireless system comprising:
    a first base station configured to determine subcarrier loading information for a first cell; and
    a second base station configured to determine subcarrier loading information for a second cell neighboring the first cell,
    wherein the first and second base stations are configured to allocate one or more subcarriers based on the determined subcarrier loading information for the first cell and the determined subcarrier loading information for the second neighboring cell.

9. The OFDMA wireless system of claim 8, wherein the first base station is located within the first cell.

10. The OFDMA wireless system of claim 8, comprising:
    a third base station configured to determine subcarrier loading information for a third cell, wherein the third cell neighbors the first cell and the second cell and wherein the first, second, and third base stations are configured to exchange subcarrier loading information.

11. The OFDMA wireless system of claim 8, wherein the first base station is configured to determine subcarrier loading information for a sector of the first cell, wherein the sector comprises less than the entirety of the first cell.

12. The OFDMA wireless system of claim 11, wherein the first base station is configured to allocate one or more subcarriers to the sector based on the determined subcarrier loading information for the first cell and wherein the first base station comprises a directional antenna configured to broadcast to the sector.

* * * * *

UNITED STATES PATENT AND TRADEMARK OFFICE
CERTIFICATE OF CORRECTION

PATENT NO. : 7,489,934 B2  
APPLICATION NO. : 11/931759  
DATED : February 10, 2009  
INVENTOR(S) : Xiaodong Li et al.

Page 1 of 1

It is certified that error appears in the above-identified patent and that said Letters Patent is hereby corrected as shown below:

On the cover page: item [56]

On the cover page, located in the References Cited under Foreign Patent Documents, (right hand column, page 2), insert the following reference --JP 7-322219 12-1995--.

Column 9, Line 21, delete the portion of text reading "and y is" and replace with --and $y_i$ is--.

Column 11, Line 6, delete the portion of text reading "SINK indexing" and replace with --SINR indexing--.

Column 16, Line 29, delete the portion of text reading "any precentage" and replace with --any percentage--.

Signed and Sealed this

Twenty-fourth Day of March, 2009

JOHN DOLL  
*Acting Director of the United States Patent and Trademark Office*